United States Patent [19]

Lee

[11] Patent Number: 5,102,079
[45] Date of Patent: Apr. 7, 1992

[54] CONNECTING ASSEMBLY FOR A TRIPOD

[76] Inventor: Jin-Ten Lee, 9-1, Lane 161, Hsingan Road Sec. 1, Taichung, Taiwan

[21] Appl. No.: 735,676

[22] Filed: Jul. 29, 1991

Related U.S. Application Data

[63] Continuation of Ser. No. 617,360, Nov. 23, 1990, abandoned.

[51] Int. Cl.⁵ .................................. F16M 11/38
[52] U.S. Cl. ................................ 248/166; 248/167; 248/170; 403/93
[58] Field of Search ............... 248/166, 167, 168, 170, 248/173, 165, 163.1, 188.6, 188.7; 403/92, 93

[56] References Cited

U.S. PATENT DOCUMENTS

| 2,634,075 | 4/1953 | Mayzel ............................. 248/170 |
| 4,010,922 | 3/1977 | Heller et al. ................. 248/170 X |
| 4,593,879 | 6/1986 | Seely et al. .................. 248/170 X |
| 4,796,843 | 1/1989 | O'Connor ....................... 248/168 |
| 4,905,946 | 3/1990 | Wang ............................ 248/170 |

Primary Examiner—Ramon O. Ramirez

[57] ABSTRACT

An improved connecting assembly for a tripod comprises a base seat and three support legs. The base seat has a pipe and three lugs. Each of the support legs has a clevis type connector at one end. Three recesses are spacedly disposed on the outer periphery of each lug. A locking bar abuts one of the recesses. A cavity is formed on the base of each connector. Each connector has two prongs with a space in between. A spring is disposed in the cavity. Each locking bar is disposed between the spring and the lug.

1 Claim, 3 Drawing Sheets

PRIOR ART

CONNECTING ASSEMBLY FOR A TRIPOD

BACKGROUND OF THE PRESENT INVENTION

The present invention relates to a tripod and more particularly to an improved connecting assembly for a tripod which can support a heavy article for a long period of time.

Referring to FIG. 1, a conventional tripod 10 comprises a base seat 11, and three legs 12a, 12b, and 12c. The base seat 11 comprises three lugs 112a, 112b, and 112c which are disposed on the outer periphery of a pipe 111. The angle between adjacent two lugs 112a and 112b, 112b and 112c, and 112c and 112a is 120 degrees. Each lug 112a, 112b, and 112c has three holes 113, 114, and 115, respectively.

A clevis type connector 13a, 13b, and 13c is disposed at on the upper end of each respective leg 12a, 12b, and 12c. The shapes of the three connectors 13a, 13b, and 13c are the same, with each clevis type connector 13a, 13b, and 13c having two lobe shaped prongs 131a and 131b. Prong 131a has a hole 133, and prong 131b has a hole 133 and a recess 135. Recess 135 has a hole 134 and two screw holes 136a and 136b.

A positioning assembly 14 comprises an axle pin 111, a retaining ring 142, a locking pin 143 with a ring 144 disposed at one end, a spring 145, a plate 146, and two screws 147a and 147b.

Lug 112a is inserted into space 132, and an axle pin 141 which passes through the pair of holes 133 and hole 113 is secured thereon by retaining ring 142. One end of locking pin 143 is inserted into hole 134 and one of the two holes 114 or 115.

The other end of locking pin 143 passes through spring 145 and positioning plate 146 so that ring 144 is exposed.

Two screws, 147a and 147b, pass through positioning plate 146 and secure into screw holes 136a and 136b, respectively.

If a heavy article is secured to the top of central rod 15, the tripod may become unstable and collapse. As the positioning pins 143 are the only fulcrum points between base seat 11 and legs 12a, 12b, and 12c, respectively, the legs will tend to be unsteady under a heavy load.

SUMMARY OF THE PRESENT INVENTION

The principal object of the present invention is to provide an improved connecting assembly for a tripod which can support a heavy article on the top of a central rod stably.

Accordingly, the improved connecting assembly has improved connecting means which can support the tripod stably. The direction of the supporting force of each locking element is along the radial direction of each respective lug. Since the locking element is disposed along the radial direction of the lug, the connecting and supporting means is strong enough to support a heavy article on the top of a central rod.

DESCRIPTION OF THE PREFERRED EMBODIMENT

Figure 1:
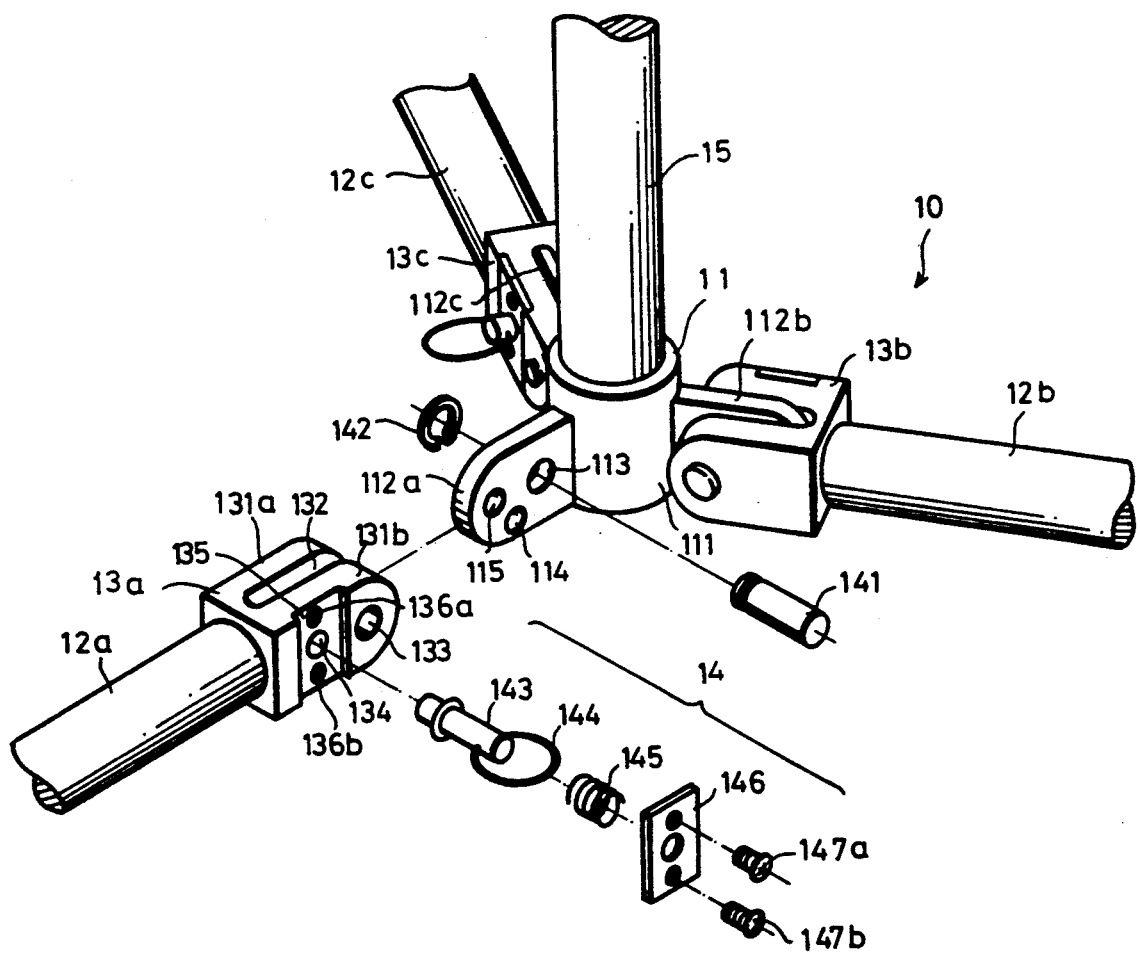
FIG. 1 is a perspective exploded view of a conventional tripod structure.
Figure 2:
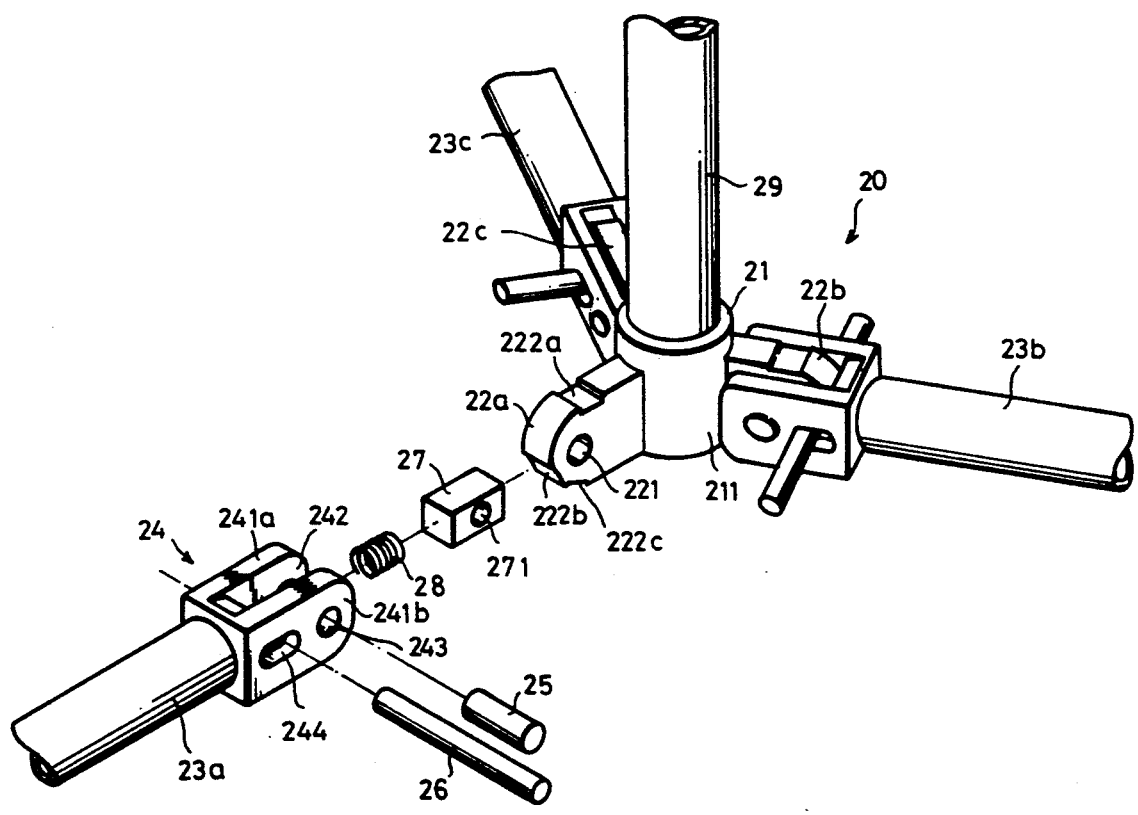
FIG. 2 is a perspective exploded view of a preferred embodiment of the improved connecting assembly for a tripod of the present invention.

Referring to FIG. 2, an improved connecting assembly for a tripod 20 comprises a coupling pipe 29 secured on one end to a base seat 21 which has a pipe 211 with three lugs 22a, 22b, and 22c, three tubular supporting legs 23a, 23b, and 23c, three positioning elements 27, and three clevis type connectors 24. The three lugs 22a, 22b, and 22c are disposed on the outer periphery of pipe 111. The angle between adjacent lugs 22a and 22b, 22b and 22c, and 22c and 22a is 120 degrees. Each lug 22a, 22b, and 22c has a pivot hole 221 and three recesses 222a, 222b, and 222c which are spacedly disposed around the periphery of each respective lug. A connector 24 is disposed on the upper end of each leg 12a, 12b, and 12c, being secured thereon by the friction fitting of a round pipe coupler 246, formed at the rear of each connector 24, into the open upper end of a respective tubular supporting leg. The shape and connection means of the three connectors 24 are the same. Each clevis type connector 24 has two lobe-shaped prongs 241a and 241b. A space 242 is formed between the prongs 241a and 241b.

Figure 3:
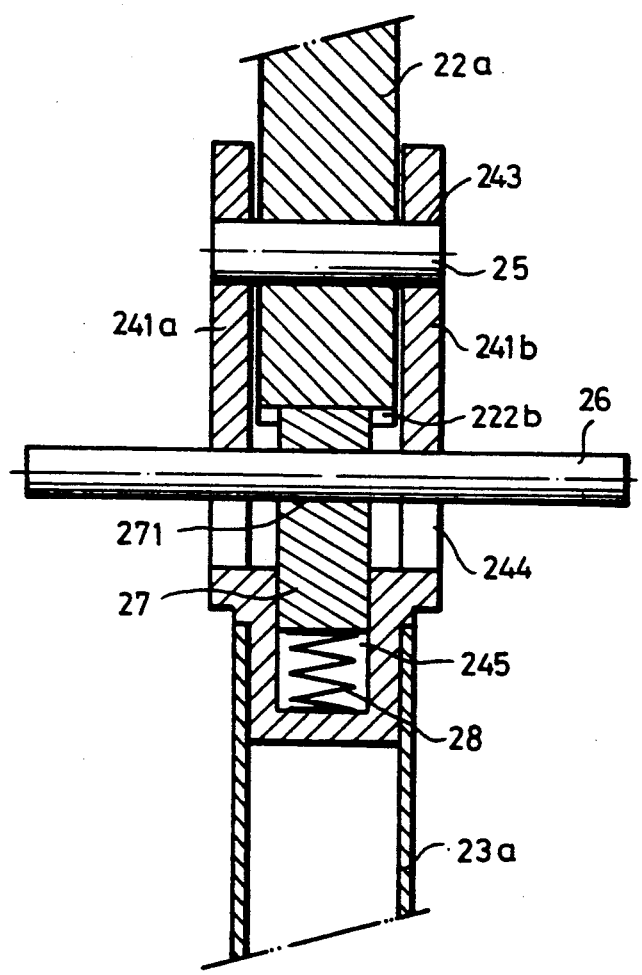
FIG. 3 is a cross-sectional view taken along line 1—1 of FIG. 1 showing an upper end of a leg locked in position with a lug, of a preferred embodiment of the improved connecting assembly for a tripod of the present invention.

Referring to FIGS. 2 and 3, a cavity 245 is formed on the base of connector 24 below space 242, extending into the pipe coupling 246 to the rear of connector 24. A locking bar 27 and a spring 28 are disposed in cavity 245 with the locking bar 27 situated between the lug 22a and the spring 28. When the tripod 20 is in use, the forward end of locking bar 27 abuts recess 222a, 222b, or 222c. Thus the direction of the supporting force of each locking bar 27 is along the radial direction of each supporting lug 23a, 23b, or 23c.

A hole 271 is formed on the side of the locking bar 27. Two through holes 243 are formed in respective lobe-shaped prongs 241a and 241b. Two oval-shaped holes 244 are formed in prongs, 241a and 241b, respectively. The lug 22a is inserted into space 242 with pivot hole 221 aligned with the two substantially equal with that of the two through holes 243 and slightly less than that of pivot hole 221, is forceably inserted through the first through hole 243 and the second through hole 243 to secure the axle pin 25 thereto by friction fit. The axle pin 25 also passes through the pivot hole 221 to rotatably secure the connector 23a to lug 22a. A round bar 26 passes through the first oval-shaped hole 244, the hole 271, and the second oval-shaped hole 244.

Whereby, a user can pull rod 26 backwards towards leg 23a to move locking bar 27 away from lug 22a and rotate leg 23a about lug 22a until locking bar 27 is aligned with a selected locking recess 222a, 222b, or 222c. Upon release, locking bar 27 moves forward to abut against the selected locking recess and secure leg 23a and lug 22a in relative position.

Rod 26 can subsequently be removed and reinserted through hole 271 when a new position is desired. Pulling back on rod 26 will once again allow rotation of leg 23a about lug 22a. By varying the relative positions of legs 23a, 23b, and 23c, the height and tilt of the tripod 20 can be adjusted. When the locking bar 27 is engaged with the locking recess 222a, the leg 23a is parallel with support pipe 29. With the other two legs 23b and 23c in a similar position, the tripod 20 can be readily transported or stored. Various fixtures for attaching instrumentation or other articles may be secured to support pipe 29 as required.

I claim:

1. An improved connecting assembly for a tripod comprising:
   a base seat with a pipe and a first, second, and third lugs, said lugs being disposed on the outer periphery of said pipe;
   a first, second, and third support legs, each said support leg having a clevis type connector secured to the upper end thereof;
   each said connector having a first and second prongs with a space formed between said first and second prongs;
   a cavity is formed on the base of each said connector, below said space;
   a spring and a locking bar are disposed within each said cavity with said spring disposed to the rear of said cavity and said locking bar disposed to the front thereof;
   a hole is formed in the side of each said locking bar;
   a first and second oval shaped holes are formed on said first and second prongs of each said connector, respectively;
   a first and second through holes are formed on said first and second prongs of each said connector, respectively;
   a first, second, and third locking recesses are spacedly formed around the outer periphery of each said lug;
   a pivot hole is formed on each said lug;
   each said lug is disposed within said space between said prongs of respective said connectors;
   an axle pin passes through said first and second through holes of respective said first and second prongs of each said connector, and through said pivot hole of each said lug;
   a said axle pin is rigidly secured to said first and second through holes of each said connector, rotatably securing each said connector to a respective said lug;
   a rod is passed through said first and second oval shaped holes of each said connector, and passes through said hole of a respective said locking bar of each said connector;
   whereby, a user can pull a said rod to the rear, separating a respective said locking bar from a respective said lug, and rotate respective said leg and attached said connector about said lug until a selected said locking recess of said lug is aligned with said locking bar, upon release said locking bar moves forward and abuts said locking recess to secure said leg and said lug in relative position, said locking bar can subsequently be removed from said hole of locking bar and reinserted when a change of position of said leg is desired.

* * * * *